UNITED STATES PATENT OFFICE.

HEINRICH COLLOSEUS, OF BERLIN, GERMANY.

TREATMENT OF BLAST-FURNACE SLAG FOR PRODUCTION OF MATERIAL SIMILAR TO TRASS, &c.

No. 817,158.

Specification of Letters Patent.

Patented April 10, 1906.

Application filed August 14, 1905. Serial No. 274,159.

*To all whom it may concern:*

Be it known that I, HEINRICH COLLOSEUS, a subject of the King of Prussia, German Emperor, residing at Berlin, Germany, have invented a certain new and useful Treatment of Blast-Furnace Slag for Production of Material Similar to Trass and the Like, of which the following is a specification.

This invention relates to a method for producing from blast-furnace slag a hydraulic binding agent which possesses properties similar to those of trass and other volcanic products of a like nature, but which is more uniform or homogeneous than the said products. The improved binding agent has, moreover, over binding agents manufactured from the natural products referred to the advantages of greater tensile strength, durability, and resistance.

Heretofore melted blast-furnace slag has been conducted into lime-milk, the object of this process being to facilitate the disintegration of the slag and not to produce a substitute for natural trass. This process described gives a product which contains from thirty to forty per cent. of water, which is in part chemically combined with the said product and in part mechanically mixed therewith, and before the product can be used as cement it must be subjected to a drying treatment and then disintegrated. Moreover, in said process the slag does not enter into chemical combination with the lime. The latter is deposited in a free state on and in the granular vitrified slag, so that during the drying of the latter a considerable portion of the mechanically-adhering lime is lost.

The present invention differs from that above referred to and consists in injecting suitable quantities of lime-milk into melted blast-furnace slag. The comparatively small quantity of water contained in the injected lime-milk is immediately decomposed or evaporated by the heat of the slag, so that the product obtained is entirely free from water and need not be subjected to a drying process. The said product has, like natural trass, a peculiar porous structure similar to that of pumice-stone, and it forms an excellent substitute for natural trass and the like.

Whereas the product obtained by the older process previously described is in the form of granular bodies of the hardness of glass containing a large proportion of water, this improved process yields a product which contains no trace of water and possesses, as already mentioned, a porous structure similar to that of natural trass. For building purposes the improved product is superior to natural trass; but in other respects it resembles the latter in use. Any kind of blast-furnace slag can be used for the purposes of the invention, even slag which is, owing to its chemical composition, not suitable for the manufacture of cement by other methods.

I am aware that it is old to treat hot liquid slag as it comes from the furnace or immediately thereafter with a large body of water for granulating and chilling purposes and that it has been suggested to run the stream of liquid slag into a large body of lime-water for the same purpose; but all these methods are entirely different from my invention, inasmuch as in the processes referred to the hot liquid metal was suddenly and all at once brought in contact with a very large volume of liquid, whereby the molten mass was suddenly chilled and broken up into fragments without effecting any noticeable evaporation of the liquid and without changing the structure, specific gravity, or physical condition of the fragments as compared with those obtained by any other method of sudden cooling, while, on the contrary, in my invention only comparatively very small quantities of a liquid having practically no chemical action on the components of the slag itself is introduced into the mass of molten material in such a manner that the molten material is largely in excess of the amount of liquid incorporated or introduced therein, the amount of liquid flowing into the body of the slag as a stream of small successive portions of liquid which will immediately evaporate as soon as they come in contact with the stream of molten material, the sudden evolution of successive small quantities of vapor within the body of the molten material producing cavities therein and changing the structure thereof, so as to impart to the mass after solidification the light pumice-like porous structure peculiar to the so-called "natural cements"—such as trass, or terras, or other kinds of trap of volcanic origin—which are valuable as building materials and when combined with lime develop very powerful hydraulic properties without any further treatment. Thus by my invention even those slags the composition of which will render them unsuitable for use as hydraulic cements proper can be converted by a mere change of physical properties into a material which possesses hydraulic properties or will develop the same with suitable additions without any further treatment.

What I claim as my invention, and desire to secure by Letters Patent of the United States, is—

1. The process of manufacturing trass-like material from blast-furnace slag, which consists in introducing into the stream of molten liquid slag small amounts of chemically-inactive liquid successively in quantities sufficient for immediate evaporation of the liquid in contact with the hot molten material.

2. The process of manufacturing trass-like material from blast-furnace slag, which consists in embodying with the molten liquid slag suitable quantities of milk of lime in amounts sufficient for immediate evaporation when in contact with the molten material.

3. The process of manufacturing trass-like material from blast-furnace slag, which consists in injecting and incorporating milk of lime into and with the stream of molten liquid slag in amounts sufficient for immediate evaporation of the same when in contact with the molten material.

In witness whereof I have signed this specification in the presence of two witnesses

HEINRICH COLLOSEUS.

Witnesses:
HENRY HASPER,
WILLIAM MAYNER.